(12) United States Patent
Hirose et al.

(10) Patent No.: US 10,482,399 B2
(45) Date of Patent: Nov. 19, 2019

(54) SHARED VEHICLE MANAGEMENT APPARATUS AND SHARED VEHICLE MANAGEMENT METHOD

(71) Applicant: NISSAN MOTOR CO., LTD., Kanagawa (JP)

(72) Inventors: Satoru Hirose, Kanagawa (JP); Kayoko Hara, Kanagawa (JP); Shigeki Satoh, Kanagawa (JP); Yukiko Nagai, Kanagawa (JP); Ryusuke Hayashi, Kanagawa (JP); Naomi Oshino, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/562,261

(22) PCT Filed: Mar. 27, 2015

(86) PCT No.: PCT/JP2015/059607
§ 371 (c)(1),
(2) Date: Sep. 27, 2017

(87) PCT Pub. No.: WO2016/157288
PCT Pub. Date: Oct. 6, 2016

(65) Prior Publication Data
US 2018/0089596 A1    Mar. 29, 2018

(51) Int. Cl.
*G06Q 10/02*    (2012.01)
*G08G 1/00*    (2006.01)
(Continued)

(52) U.S. Cl.
CPC ......... *G06Q 10/02* (2013.01); *G01C 21/3476* (2013.01); *G01C 21/362* (2013.01);
(Continued)

(58) Field of Classification Search
CPC ...... G06Q 10/02; G06Q 10/06; G06Q 10/025; G06Q 10/087; G06Q 50/12; G06Q 10/047;
(Continued)

(56) References Cited

U.S. PATENT DOCUMENTS 5,243,528 A *  9/1993  Lefebvre .............. G01C 21/367
340/990
2007/0255493 A1* 11/2007  Ayoub .................. G01C 21/362
701/431

(Continued)

FOREIGN PATENT DOCUMENTS

JP    H11-312290 A    11/1999
JP    2002-175588 A    6/2002
(Continued)

OTHER PUBLICATIONS

International Preliminary Report on Patentability issued in PCT/JP2015/059607, dated Sep. 28, 2017 (8 pages).

*Primary Examiner* — George Chen
(74) *Attorney, Agent, or Firm* — Osha Liang LLP

(57) ABSTRACT

A shared vehicle management apparatus for managing shared vehicles shared by users includes a first storage configured to store information on a plurality of stations at which the shared vehicles can be rented and returned, a reservation acceptance device configured to accept a use reservation of a shared vehicle from a user, the use reservation including information on a departure station and an arrival station, the departure station being set by the user as a station from which the user expects to use the shared vehicle, and the arrival station being set by the user as a station to which the user returns the shared vehicle after use, a return occasion detector configured to detect a return start (Continued)

occasion on which the user using the shared vehicle returns the shared vehicle, and a route guidance device.

15 Claims, 14 Drawing Sheets

(51) Int. Cl.
    *G01C 21/34*     (2006.01)
    *G01C 21/36*     (2006.01)
    *G06Q 50/30*     (2012.01)

(52) U.S. Cl.
    CPC ..... *G01C 21/3617* (2013.01); *G01C 21/3676* (2013.01); *G06Q 50/30* (2013.01); *G08G 1/00* (2013.01); *G08G 1/205* (2013.01)

(58) Field of Classification Search
    CPC .............. G06Q 30/0645; G06Q 50/30; G01C 21/3476; G01C 21/3617; G01C 21/362; G01C 21/3676; G08G 1/00; G08G 1/205
    See application file for complete search history.

(56) References Cited

U.S. PATENT DOCUMENTS

| | | | |
|---|---|---|---|
| 2008/0021756 A1* | 1/2008 | Kesavan | G06Q 10/06 705/307 |
| 2008/0027599 A1* | 1/2008 | Logan | G05D 1/0234 701/23 |
| 2008/0177471 A1* | 7/2008 | Deurwaarder | G01C 21/3655 701/414 |
| 2009/0319176 A1* | 12/2009 | Kudoh | G01C 21/3617 701/408 |
| 2010/0026526 A1* | 2/2010 | Yokota | G08G 1/096827 340/996 |
| 2010/0082246 A1 | 4/2010 | Crane | |
| 2011/0004342 A1* | 1/2011 | Knopow | A47L 5/28 700/253 |
| 2012/0143495 A1* | 6/2012 | Dantu | G01C 21/206 701/428 |
| 2015/0198459 A1* | 7/2015 | MacNeille | G01C 21/3469 701/22 |
| 2016/0140851 A1* | 5/2016 | Levy | G08G 5/0069 701/3 |
| 2016/0153789 A1* | 6/2016 | Gallar | G01C 21/3635 701/408 |

FOREIGN PATENT DOCUMENTS

| | | |
|---|---|---|
| JP | 2009-270960 A | 11/2009 |
| JP | 2010-066230 A | 3/2010 |
| JP | 2010-257111 A | 11/2010 |
| JP | 2011-158294 A | 8/2011 |

\* cited by examiner

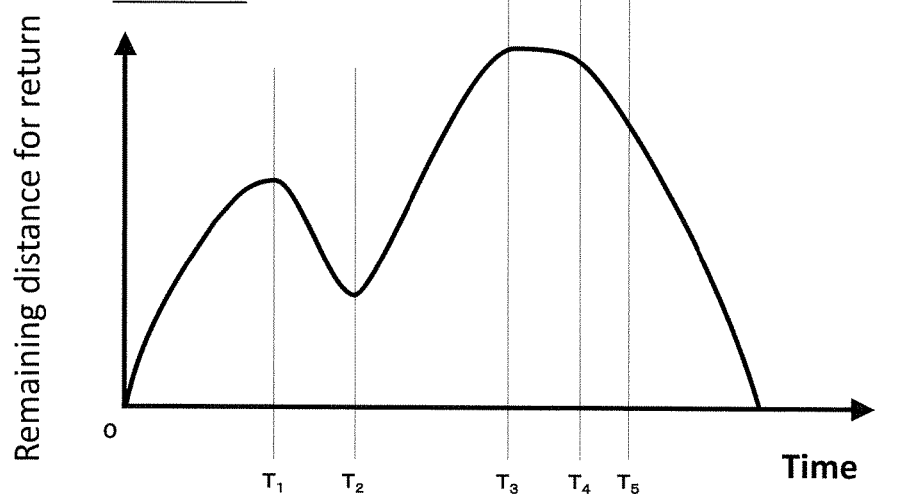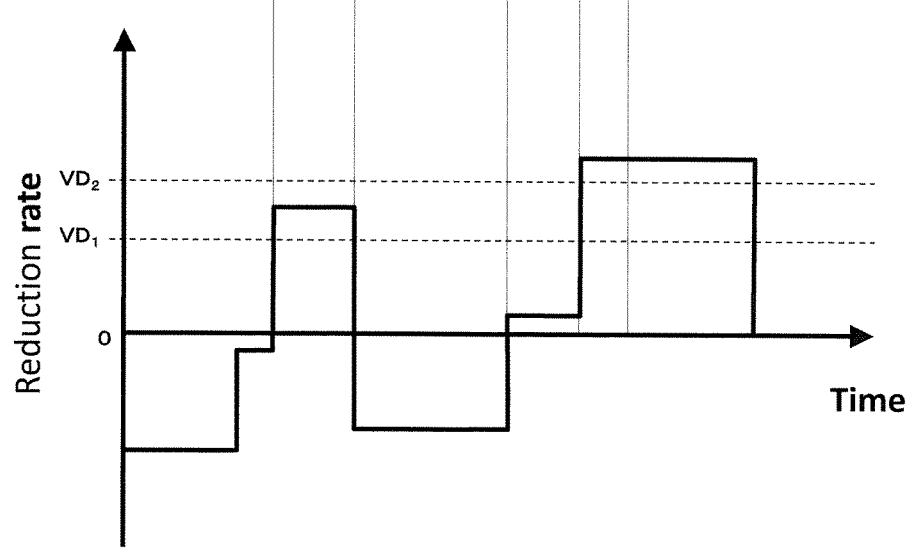

SHARED VEHICLE MANAGEMENT APPARATUS AND SHARED VEHICLE MANAGEMENT METHOD

BACKGROUND

Technical Field

The present invention relates to a shared vehicle management apparatus and a shared vehicle management method that manage a plurality of shared vehicles used by users.

Background Art

Car sharing systems are known in which a plurality of users can use shared vehicles. Among such car sharing systems, a system is proposed in which the user can freely set a place from which the user rents a shared vehicle and a place to which the user returns the shared vehicle. In a known technique employed in such a car sharing system, when the user takes a procedure using a terminal to start use of the shared vehicle, the user sets a destination using the terminal so that a route to the destination is automatically displayed on a navigation device equipped in the shared vehicle to be used by the user (e.g., Patent Document 1).
Patent Document 1: JP11-312290A (H11-312290 (1999))

SUMMARY

In Patent Document 1, however, when the user does not head directly (go straight) to the destination, that is, such as when the user takes a detour on the way to the destination and when the departure place and the return space for the shared vehicle are set at the same location and the user travels around the location, a route toward the return space will be guided to the user even at a time point at which the user does not yet have an intention to return the shared vehicle. This may lead to the user feeling uncomfortable because information which is not immediately necessary is continued to be guided to the user.

One or more embodiments of the present invention mitigates an uncomfortable feeling given to a user by guiding a route toward a return space at appropriate timing to the user when the user does not head directly (go straight) to a destination.

One or more embodiments of the present invention includes detecting an occasion on which a user using a shared vehicle returns the shared vehicle and using the detected occasion as a trigger to guide a route from the current position of the shared vehicle to a return space.

According to one or more embodiments of the present invention, the route from the current position of the shared vehicle to the return space is guided to the user in accordance with the occasion on which the user returns the shared vehicle, and the uncomfortable feeling given to the user is therefore mitigated because the above route is guided to the user at appropriate timing even when the user does not head directly (go straight) to the destination after the user starts to use the shared vehicle.

BRIEF DESCRIPTION OF THE DRAWINGS

FIG. 5 is a diagram illustrating an example of a method of detecting a return start occasion.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The embodiments will be described using an example in which the shared vehicle management apparatus is applied to a shared vehicle management system that manages and operates a car sharing system configured such that a plurality of users shares vehicles allocated to a plurality of stations. In the car sharing system according to one or more embodiments of the present invention, the station from which the shared vehicle is rented and the station to which the shared vehicle is returned may be or may not be the same. Each station represents a location at which shared vehicles can be parked, rented and returned and shared vehicles not in use can be on standby. Examples of such a station include a parking area prepared for the car sharing system.

Figure 1A:
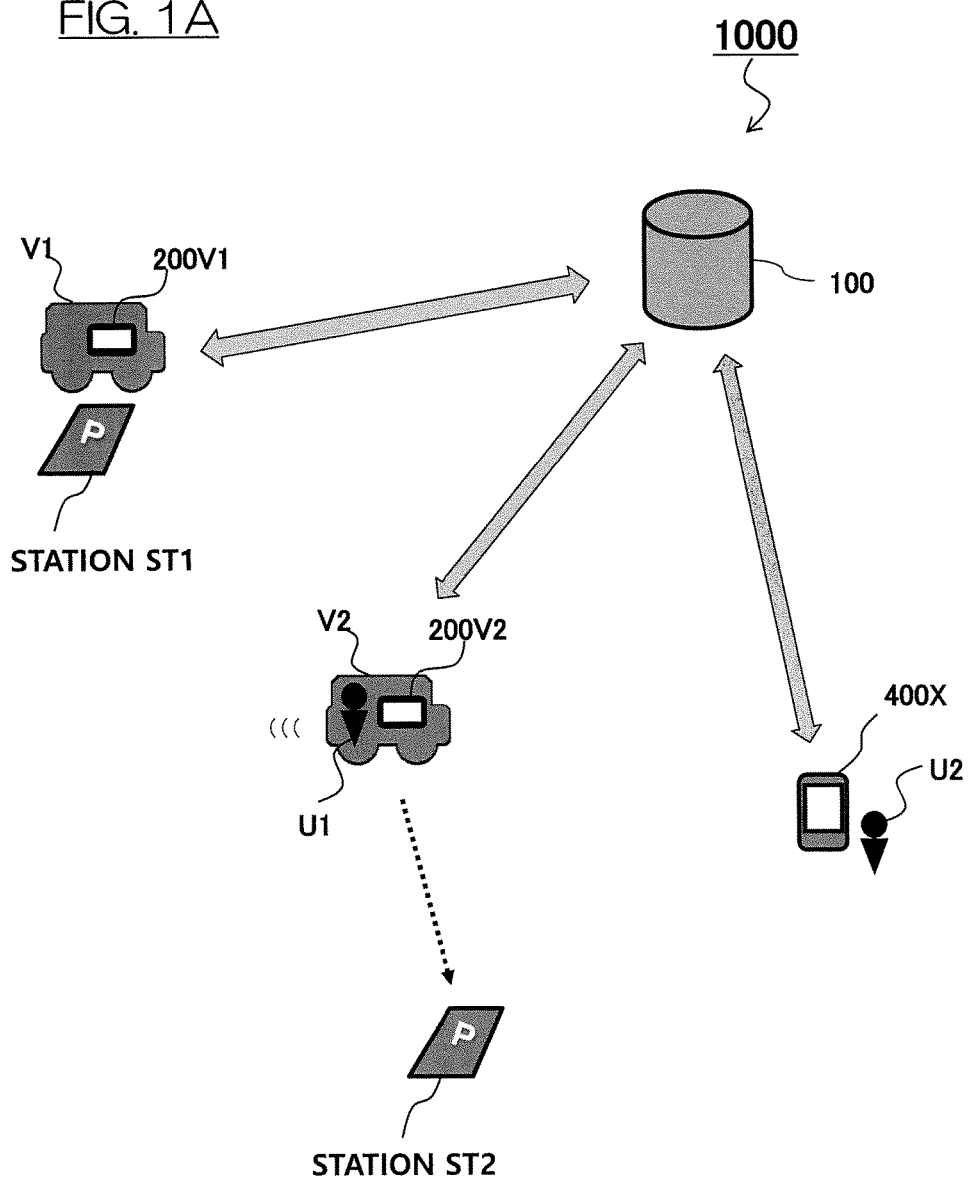
FIG. 1A is a schematic view illustrating an example of a method in which users use shared vehicles in a shared vehicle management system comprising a shared vehicle management apparatus according to one or more embodiments of the present invention.

FIG. 1A is a schematic view illustrating an example of a method in which users use shared vehicles in a shared vehicle management system 1000 comprising a shared vehicle management apparatus 100 according to one or more embodiments of the present invention. FIG. 1A illustrates a scene in which a user U1 uses a shared vehicle V2 and a station ST2 is set as a station (arrival station) to which the shared vehicle V2 is returned after use while another user U2 is just about to reserve the use of any of the shared vehicles using a user terminal device 400X. In the shared vehicle management system 1000 according to one or more embodiments of the present invention, the user U2 operates the user terminal device 400X to select a station (departure station), from which the user U2 expects to use a shared vehicle, from among a plurality of stations managed by the shared vehicle management apparatus 100 and reserves the use of a shared vehicle that is ready for use from the selected departure station.

For example, in the scene illustrated in FIG. 1A, when selecting a station ST1 as the departure station, the user U2 can reserve the use of a shared vehicle V1 that is ready for use from the station ST1. At the time of this reservation, the user U2 may also set any station as the station (arrival station) to which the user U2 returns the shared vehicle after use. In an alternative embodiment, the user U2 may set the arrival station at a desired time after reserving the use of the shared vehicle. Thus, a drop off-type one-way car sharing system is made available in which the user can get on the reserved, shared vehicle, that is, can use the reserved, shared vehicle, and can thereafter return the used, shared vehicle to the set arrival station.

On the other hand, when the user U2 selects the station ST2 as the departure station in the scene illustrated in FIG. 1A, no shared vehicles are ready for use from the station ST2 and, therefore, the shared vehicle management apparatus 100 transmits information to the user terminal device 400X carried by the user U2, the information representing that the station ST2 does not have a currently-available shared vehicle and a shared vehicle cannot be rented from the station ST2. In addition or alternatively, when the user U2 selects the station ST2 as the departure station in the scene illustrated in FIG. 1A, the shared vehicle management apparatus 100 maintains a state in which rental of a shared vehicle cannot be accepted.

The above is the basic configuration of the one-way car sharing system in one or more embodiments of the present invention. In one or more embodiments of the present invention, in such a one-way car sharing system, the shared vehicle management apparatus 100 detects an intention to return a shared vehicle from the user using the shared vehicle and uses this timing as a trigger to guide, to the user, information on a route to the arrival station set by the user.

Figure 1B:
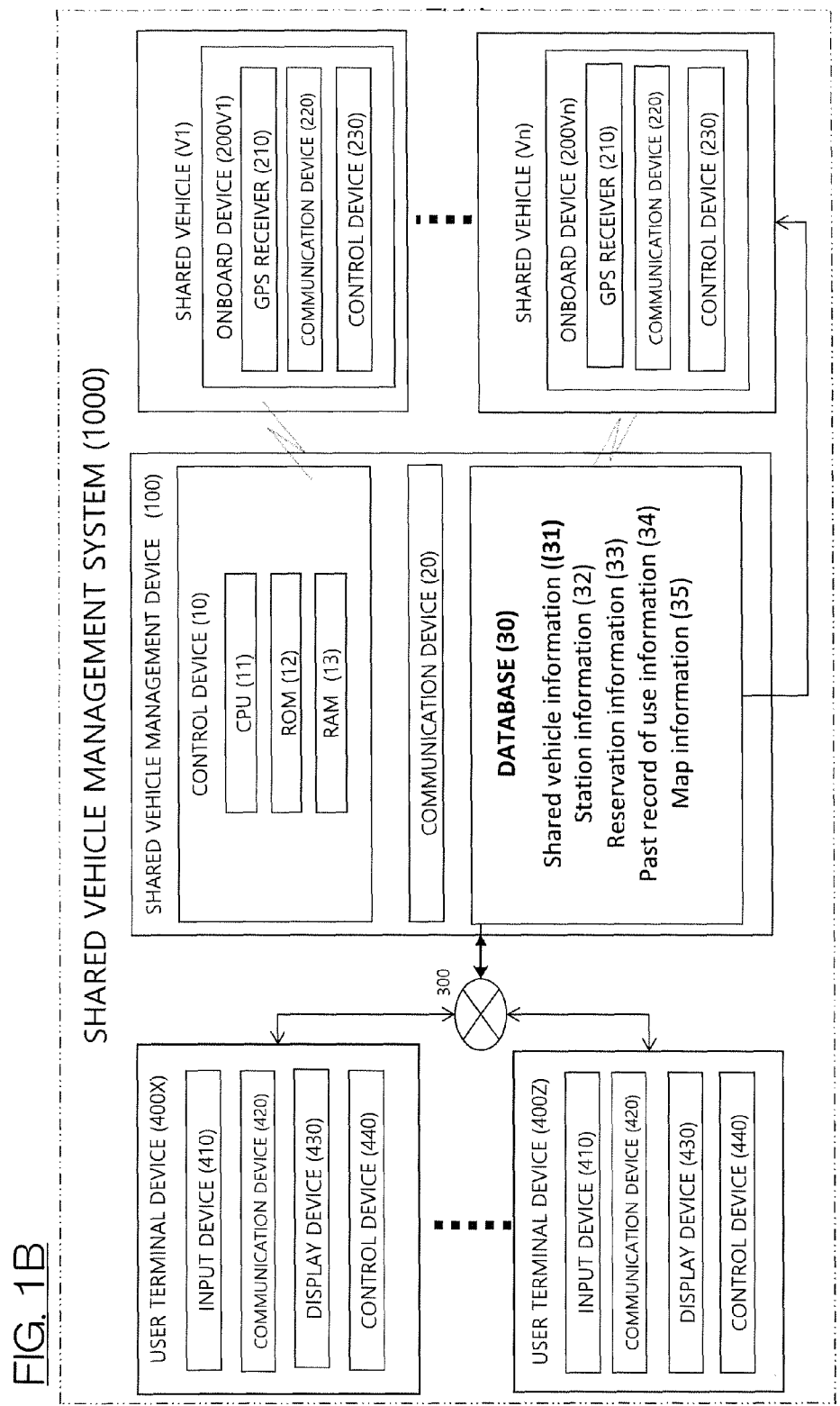
FIG. 1B is a block diagram of a shared vehicle management system comprising a shared vehicle management apparatus according to one or more embodiments of the present invention.

FIG. 1B is a block diagram illustrating the shared vehicle management system 1000 according to one or more embodiments of the present invention. As illustrated in FIG. 1B, the shared vehicle management system 1000 according to one or more embodiments of the present invention has the shared vehicle management device 100, onboard devices 200V1 to 200Vn (which may be collectively referred to as an "onboard device 200Vn," hereinafter) carried respectively by shared vehicles V1 to Vn (which may be collectively referred to as a "shared vehicle Vn" or "shared vehicles Vn," hereinafter) used by the users, and user terminal devices 400X to 400Z (which may be collectively referred to as a "user terminal device 400X," hereinafter) carried by the users. The numbers of the onboard devices 200V1 to 200Vn and user terminal devices 400X to 400Z, which constitute the shared vehicle management system 1000 according to one or more embodiments of the present invention, are not limited.

The shared vehicle management device 100, onboard devices 200V1 to 200Vn, and user terminal devices 400X to 400Z include respective communication devices (20, 220, and 420) and can exchange information with one another via an electric communication network, such as the Internet 300. The communication path may be wired or wireless.

The user terminal device 400X according to one or more embodiments of the present invention is a computer comprising a read only memory (ROM) that stores programs applied to the user terminal device 400X according to one or more embodiments of the present invention, a central processing unit (CPU) as an operation circuit that executes the programs stored in the ROM to perform each function, and a random access memory (RAM) that functions as an accessible storage device. The user terminal device 400X according to one or more embodiments of the present invention may be a personal computer, smartphone, personal digital assistant (PDA), or other handheld terminal device.

The user terminal device 400X according to one or more embodiments of the present invention includes an input device 410 that accepts input information from each user, such as a use reservation to request the use of a shared vehicle Vn from a desired departure station, a communication device 420 that performs communication with external devices such as the shared vehicle management device 100, a display device 430 for notifying the user of information, and a control device 440 that executes a control process for the use of the shared vehicle Vn by the user.

The input device 410 of the user terminal device 400X may be, for example, any of devices with which the user can input data by manual operation, such as a touch panel disposed on the display screen and a joystick, and devices with which the user can input data by voice, such as a microphone. Examples of the display device 430 include a display. When a touch panel display is used, it can serve as both the display device 430 and the input device 410.

The control device 440 according to one or more embodiments of the present invention uses a position acquisition device, such as a global positioning system (GPS) receiver (not illustrated), of the user terminal device 400X to acquire information on the current position of the user who operates the user terminal device 400X, and transmits the acquired information on the current position to the shared vehicle management apparatus 100 via the communication device 420.

In addition, the control device 440 accepts input information, such as a use reservation with which each user requests the use of a shared vehicle Vn, and transmits the input information to the shared vehicle management apparatus 100 via the communication device 420. In one or more embodiments of the present invention, examples of the use reservation of a shared vehicle Vn include a reservation of immediate use with which the user starts to use the shared vehicle Vn immediately after transmitting the use reservation and a reservation of reserved use with which the user starts to use the shared vehicle Vn from a time the user desires.

The above-described use reservation includes ID information of the user, information on the current position of the user, information on the departure station which is set by the user, ID information of the shared vehicle Vn which the user expects to use, and information on the arrival station which is set by the user. In the car sharing system according to one or more embodiments of the present invention, the use reservation may not include information on the time at which the user starts to use the shared vehicle Vn and the time at which the user returns the shared vehicle Vn. That is, in the car sharing system according to one or more embodiments of the present invention, the user can start the use of the shared vehicle Vn and return it at any time without setting the time at which the user starts to use the shared vehicle Vn and the time at which the user returns it. If necessary, the user terminal device 400X according to one or more embodiments of the present invention receives other information from the shared vehicle management apparatus 100, such as information on each station and information on candidates for use of shared vehicles Vn in each station.

In one or more embodiments of the present invention, at least one of the user terminal device 400X and the onboard device 200Vn serves as a navigation device for guiding a travel route of the shared vehicle Vn to the user. When the user terminal device 400X serves as the navigation device, the user terminal device 400X can be configured, for example, to preliminarily store map information in a memory such as a ROM of the user terminal device 400X, display on the display device 430 the current position of the shared vehicle Vn which is currently used by the user and the position of the arrival station which is set by the user, together with the map information, and guide the travel route from the current position of the shared vehicle Vn to the arrival station.

The onboard device 200Vn according to one or more embodiments of the present invention includes a GPS receiver 210 that detects the current position of each shared vehicle Vn, a communication device 220 that performs communication with external devices such as the shared vehicle management apparatus 100, and a control device 230 that executes a control process for the use of the shared vehicle Vn by the user.

The onboard device 200Vn may be provided as a simple mechanism that utilizes functions of the user terminal device 400X. For example, when the user terminal device 400X is equipped with a GPS receiver, communication device, and device for route calculation and route guidance, the onboard device 200Vn may utilize their functions and perform only authentication of a user, which will be described below.

In one or more embodiments of the present invention, the control device 230 uses an authentication device (not illustrated) of the onboard device 200Vn to perform user authentication as to whether or not the user getting on the shared vehicle Vn is identical with the user who has reserved the use of the shared vehicle Vn. For example, the control device 230 performs user authentication of the user getting on the shared vehicle Vn through using a device capable of communication via near field communication (NFC) as the authentication device to read ID information of the user, such as from the user terminal device 400X and membership card carried by the user, and further accessing the shared vehicle management apparatus 100 via the communication device 220 to acquire the reservation information of the shared vehicle Vn.

The control device 230 transmits information on the current position acquired using the GPS receiver 210 to the shared vehicle management apparatus 100 via the communication device 220.

The control device 230 notifies the user of information transmitted from the shared vehicle management apparatus 100, etc., such as using a display and speaker, which are not illustrated. In one or more embodiments of the present invention, the control device 230 receives information on each station, information on available shared vehicles Vn in each station and other information, for example, from the shared vehicle management apparatus 100 and notifies the user of the information.

In one or more embodiments of the present invention, like the above-described user terminal device 400X, the onboard device 200Vn may also serve as a navigation device for guiding the travel route from the current position of the shared vehicle Vn to the arrival station.

The shared vehicle management apparatus 100 according to one or more embodiments of the present invention, which serves as a server of the shared vehicle management system 1000, includes a control device 10 that executes a control process for managing and operating the car sharing system, a communication device 20 that can communicate mutually with each of the onboard device 200Vn and the user terminal device 400X, and a database 30 that stores information received by the communication device 20, information on each shared vehicle Vn, information on each station, and other necessary information.

In one or more embodiments of the present invention, the control device 10 stores the information, which is received from each user terminal device 400X and each onboard device 200Vn via the communication device 20, appropriately in the database 30. Then, the control device 10 uses each function, which will be described later, to manage the use and return of the shared vehicle Vn by the user on the basis of the information received by the communication device 20 and the information stored in the database 30.

Figure 2:
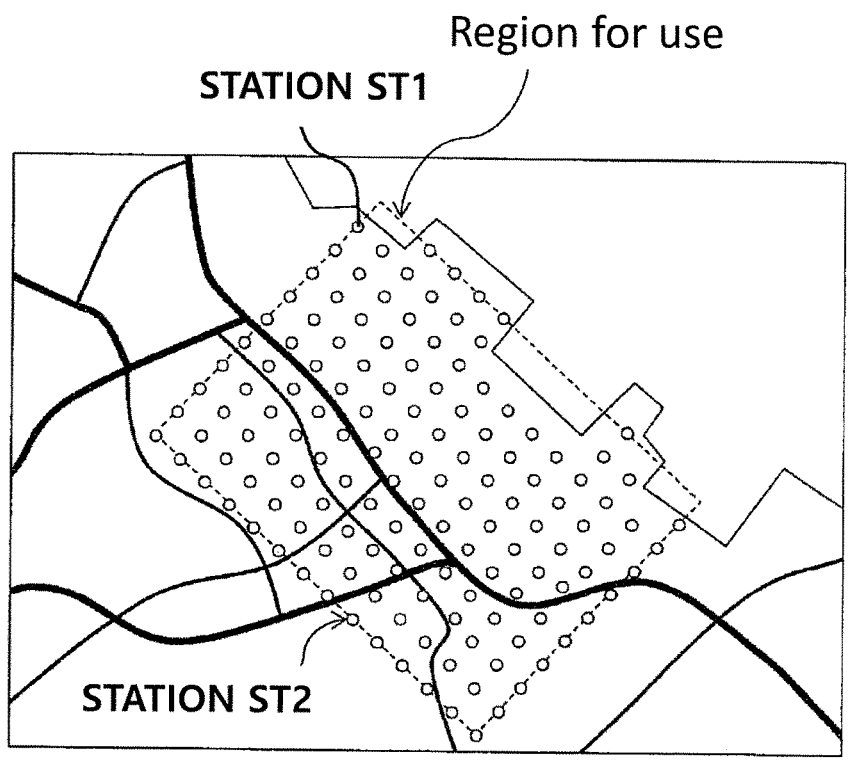
FIG. 2 is a diagram illustrating stations at which shared vehicles managed by the shared vehicle management system of FIG. 1B are allocated.

For example, in one or more embodiments of the present invention, the control device 10 can manage the use and return of the shared vehicle Vn by the user in a scene in which, as illustrated in FIG. 2, a plurality of stations denoted by circles is provided within a predetermined region for use (region represented by broken lines in FIG. 2) on the map and the user uses the shared vehicle Vn rented from a station ST1 and thereafter returns the shared vehicle Vn to a station ST2. In the example illustrated in FIG. 2, the stations are arranged such that the distance between two adjacent stations is equal, but the arrangement of the stations is not limited to this.

The control device 10 further has a function to detect an intention of the user who is using the shared vehicle Vn and willing to return the shared vehicle Vn. Specifically, the control device 10 uses the information on the current position of the shared vehicle Vn used by the user and the information on a use history of shared vehicles Vn by the user to detect an occasion with which the user starts to return the shared vehicle Vn (referred to as a "return start occasion," hereinafter) as the intention of return, on the basis of predetermined criteria for determination. Then, when detecting the above return start occasion, the control device 10 uses it as a trigger to start guidance of the travel route from the current position of the shared vehicle Vn to the arrival station. As described above, the guidance of the travel route can be performed using the onboard device 200Vn, user terminal device 400X, etc.

Figure 3A:
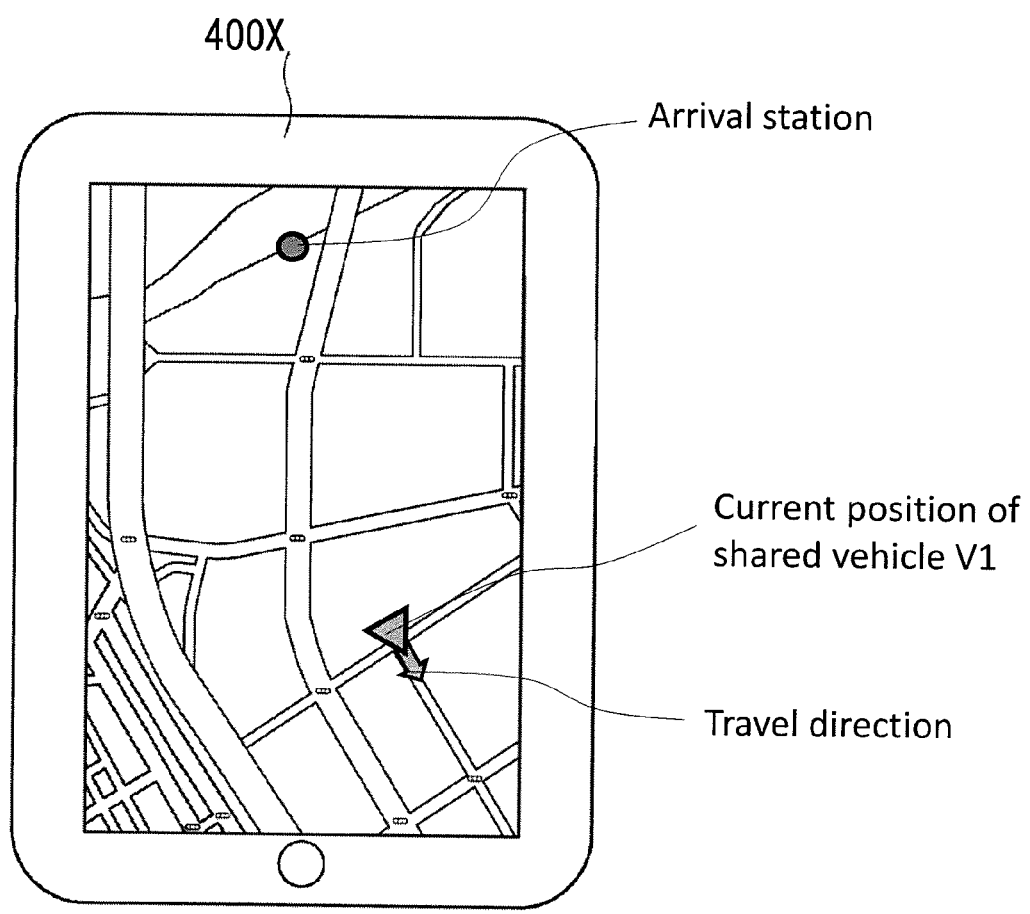
FIG. 3A is a diagram illustrating an example of a state in which a route to an arrival station is not guided to the user.
Figure 3B:
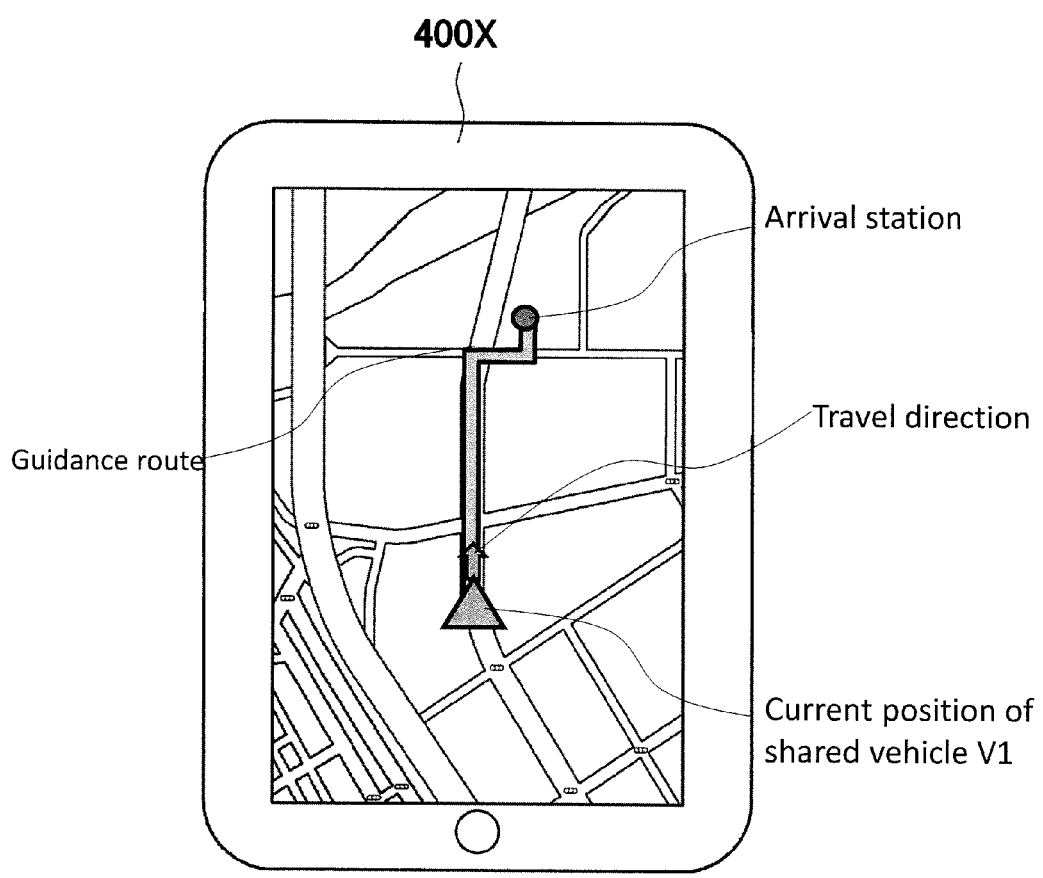
FIG. 3B is a diagram illustrating an example of a state in which a route to an arrival station is guided to the user.

In one or more embodiments of the present invention, in a scene in which the user starts to use the shared vehicle Vn from the departure station and then heads to the arrival station without taking a detour (dropping), for example, the control device 10 detects the return start occasion to start the guidance of the travel route relatively early after the user starts to use the shared vehicle Vn. On the other hand, when the user does not go straight (head directly) to the destination, that is, such as when the user takes a detour on the way to the destination and when the departure station and arrival station are set at the same location and the user travels around the location (so-called a round trip), the travel route is not displayed during the detour of the user as illustrated in FIG. 3A, and upon detection of the return start occasion for the user, it is used as a trigger to display the guidance of the travel route as illustrated in FIG. 3B. FIG. 3A and FIG. 3B are diagrams each illustrating an example in which the user terminal device 400X displays a map around the shared vehicle Vn. In the example of FIG. 3B, a route (guidance route) from the current position of the shared vehicle Vn to the arrival station is displayed.

In one or more embodiments of the present invention, after the return start occasion for the user is detected, the guidance route may be continued to be displayed until the user returns the shared vehicle Vn, or the display of the guidance route may be suspended when the user starts a detour or round trip after the return start occasion for the user is detected.

Methods for the control device 10 to detect the return start occasion for the user are not particularly limited. For example, any of the following methods can be used.

Figure 4:
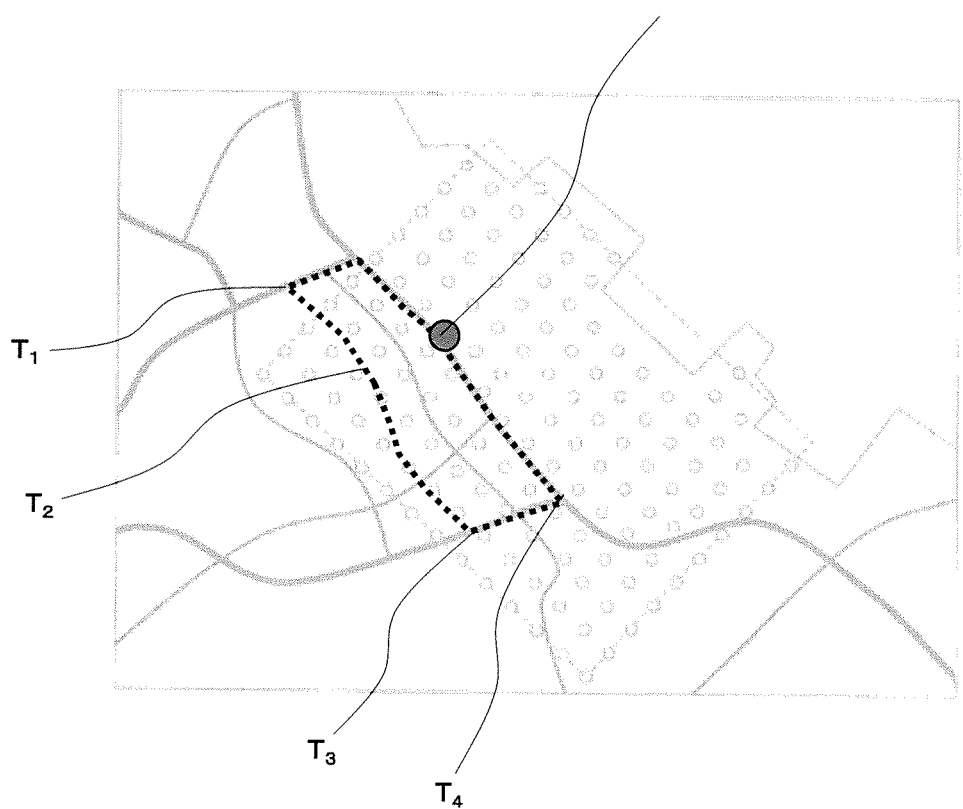
FIG. 4 is a diagram illustrating an example of a travel history when the user uses a shared vehicle.

First, the control device 10 can use a method of calculating a distance from the current position of the shared vehicle Vn used by the user to the arrival station for the shared vehicle Vn as a remaining distance for return on the basis of the information on the current position of the shared vehicle Vn and detecting an intention of return of the user on the basis of the calculated remaining distance for return. An example of the method will be described with reference to FIG. 5. In this example, the return start occasion is detected on the basis of the above remaining distance for return in a scene in which the user sets the departure station and the arrival station as the same station and travels around the station (a scene in which, as illustrated in FIG. 4, the shared vehicle Vn travels from a station ST3 on a route as represented by the broken lines and returns to the station ST3). The upper diagram of FIG. 5 is a graph representing a variation with time of a direct distance between the shared vehicle Vn and the arrival station in a scene in which the user travels as illustrated in FIG. 4. The lower diagram of FIG. 5 is a graph representing a reduction rate of the remaining distance for return per unit time (e.g. a value of reduction amount of the remaining distance for return per one minute) and corresponding to the upper diagram of FIG. 5. The reduction rate takes a positive value when the shared vehicle Vn is traveling toward the arrival station and takes a negative value when the shared vehicle Vn is traveling to depart from the arrival station. $T_1$ to $T_4$ in FIG. 4 represent time points at which the shared vehicle Vn travels at those points, and correspond to $T_1$ to $T_4$ of FIG. 5.

Figure 6A:
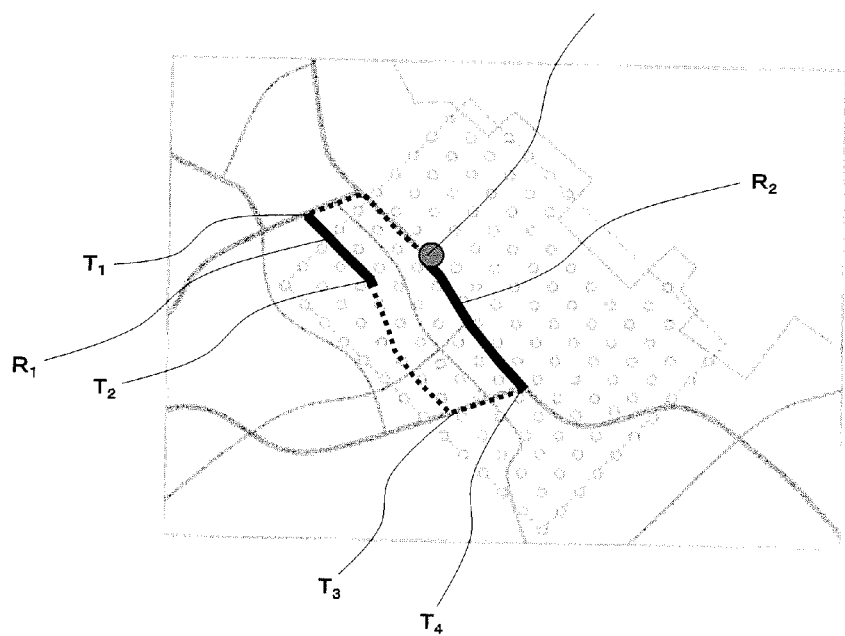
FIG. 6A is a diagram illustrating an example of sections in which the route is guided to the user when a threshold for detecting the return start occasion is low.

In the scene illustrated in FIG. 4, the control device 10 detects, as the return start occasion, a time period from time $T_1$ to time $T_2$ in which the reduction rate of the remaining distance for return is a threshold $VD_1$ or more in the graph of the lower diagram of FIG. 5 and a time period from time $T_4$ to the time when the shared vehicle Vn arrives at the arrival station. In this case, as illustrated in FIG. 6A, the control device 10 displays the guidance route to the user within a section (section $R_1$) from time $T_1$ to time $T_2$ and a section (section $R_2$) from time $T_4$ to the time when the shared vehicle Vn arrives at the station ST3.

In addition or alternatively, the control device 10 may take into account a travel direction (direction of a movement vector) of the shared vehicle Vn to detect the return start occasion. For example, the control device 10 acquires information on parameters, such as a speed, travel direction and movement trajectory of the shared vehicle Vn, and calculates the movement vector of the shared vehicle Vn on the basis of the acquired information. When the direction of the movement vector of the shared vehicle Vn is within a predetermined angle from a reference direction that is defined as a direction connecting between the current position of the shared vehicle Vn and the arrival station, or when this state continues for a predetermined time period $T_n$ or more, the control device 10 may detect this event as the return start occasion. The above-described movement vector for detecting the return start occasion can be obtained, for example, by calculating an average movement vector within a predetermined time period on the basis of the parameters, such as a speed, travel direction and movement trajectory of the shared vehicle Vn, within the predetermined time period.

Figure 6B:
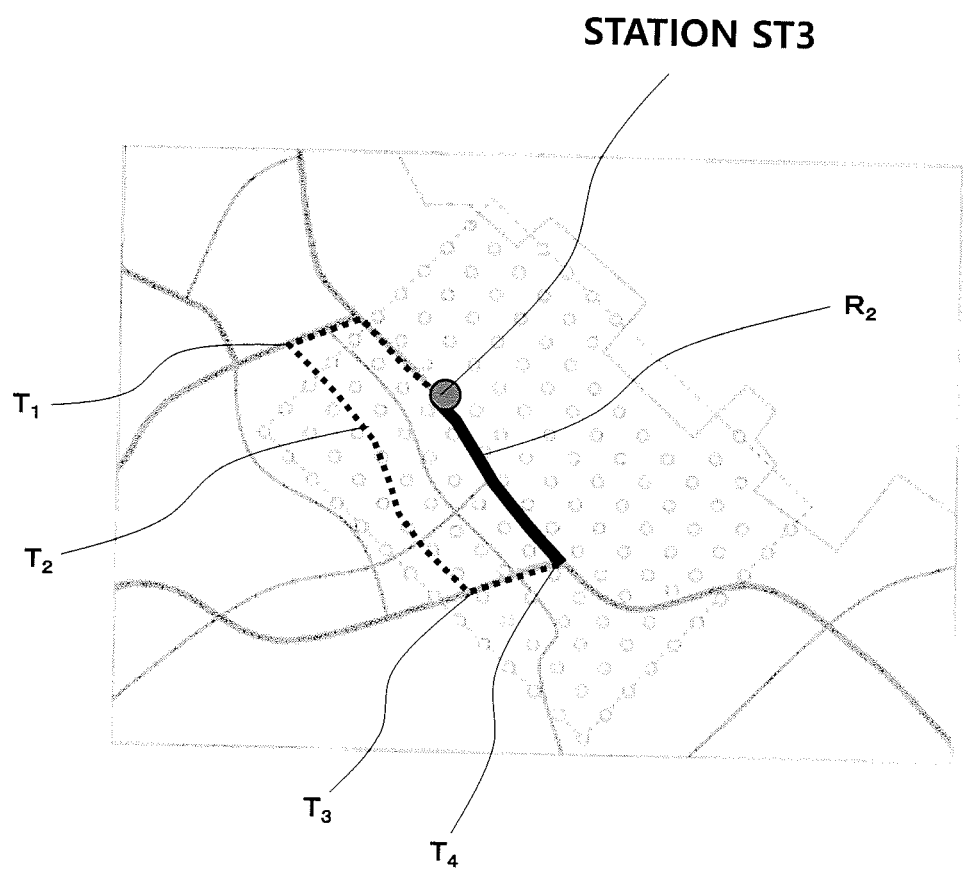
FIG. 6B is a diagram illustrating an example of a section in which the route is guided to the user when a threshold for detecting the return start occasion is high.

In addition or alternatively, the control device 10 may take into account situations, such as a state of the shared vehicle Vn and a situation when the user reserves the use of the shared vehicle Vn, to change a threshold for detecting the return start occasion. For example, as illustrated in the lower diagram of FIG. 5, the threshold $VD_1$ may be changed to a threshold $VD_2$ to increase the threshold for detecting the return start occasion so that the return start occasion can be more correctly detected. This will be specifically described. When the threshold $VD_1$ is used to detect the return start occasion, the guidance route is displayed, as illustrated in FIG. 6A, even within a section (section from time $T_1$ to time $T_2$ (section $R_1$)) in which the user is not willing to return the shared vehicle Vn. In contrast, when the threshold $VD_1$ is changed to the threshold $VD_2$, the guidance route can be displayed, as illustrated in FIG. 6B, only within a section (section from time $T_4$ to the time when the shared vehicle Vn arrives at the station ST3 (section $R_2$)) in which the user is actually willing to return the shared vehicle Vn.

Examples of the method of changing the threshold for detecting the return start occasion include, for example, a method of changing the threshold in accordance with the use history of shared vehicles Vn by each user. Here, information on the use history of shared vehicles Vn by each user can be obtained through accumulating and storing in the database 30 the necessary information, such as information on the departure station and arrival station and information on the use time when the user used shared vehicles Vn in past times. The control device 10 estimates the tendency of a user who reserves the use of a shared vehicle Vn, such as a use time for the user to use the reserved shared vehicle Vn at this time and the possibility of a detour, on the basis of the information on the use reservation and the information on the above use history and can use the estimated result as the basis to set the above threshold at a high value, such as when the use time for the user to use the shared vehicle Vn is long and when the set arrival station has a regional attribute of a high possibility of detour.

Figure 7:
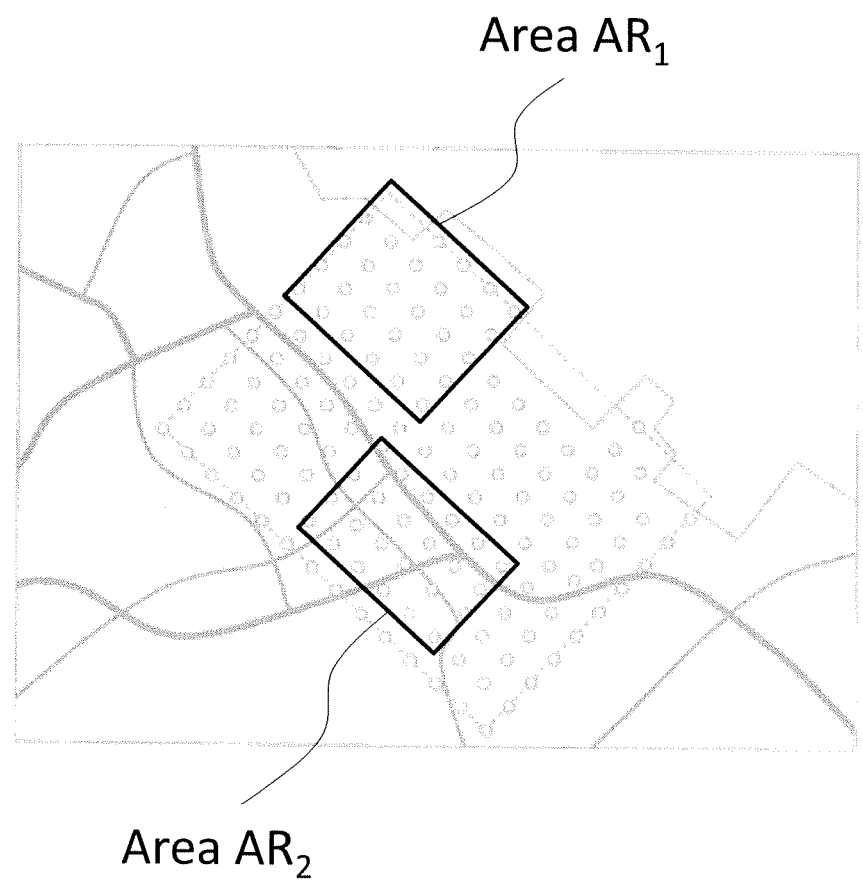
FIG. 7 is a diagram illustrating an example of setting a regional attribute in terms of each area.

Examples of the arrival station having a regional attribute of a high possibility of detour include a station around which facilities that trigger a detour, such as a sightseeing spot and shop, exist. On the other hand, examples of the arrival station having a regional attribute of a low possibility of detour include a station that is disposed at a location, such as parking areas of a government's office and office building, to which the user tends to directly head without taking a detour. In one or more embodiments of the present invention, the regional attribute of a station may be set in terms of an area, such as areas $AR_1$ and $AR_2$ illustrated in FIG. 7, for example, and may also be individually set for each station. When the regional attribute is set in terms of an area as illustrated in FIG. 7, areas around a rail station and sightseeing spot, for example, may be set as areas having regional attributes of a high possibility of detour.

In addition or alternatively, the threshold for detecting the return start occasion may be changed in accordance with an attribute of the day when the user is using the shared vehicle Vn. In general, on weekdays (such as Monday to Thursday), many users use shared vehicles Vn for the purposes of coming to work, moving in work, returning to home, etc. and thus tend to travel from the departure station to the arrival station directly. On a day of such an attribute, therefore, the threshold for detecting the return start occasion is set at a low value to display the guidance route at early timing. In contrast, on holidays (such as Saturday, Sunday, and public holiday), many users use shared vehicles Vn while taking a detour for the purposes of sightseeing, etc. On a day of such an attribute, therefore, the threshold for detecting the return start occasion is set at a high value to display the guidance route so as to match the timing when the user is actually willing to return the shared vehicle Vn.

In addition or alternatively, the threshold for detecting the return start occasion may be changed in accordance with the time when the user is using the shared vehicle Vn. For example, in the morning hours and evening hours, many users use shared vehicles Vn to travel directly to the destination for the purposes of coming to work, returning to home, etc. and, therefore, the threshold for detecting the return start occasion is set at a low value, as described above, to display the guidance route at early timing. In particular, as the time when the user is using the shared vehicle Vn comes close to the end of hours (business hours) in which the shared vehicle Vn is available (e.g., comes close to 20:00 when the end of business hours is 20:00), the above threshold can be set at a lower value thereby to perform the guidance which matches the feeling of the user who is willing to return the shared vehicle Vn by the end of business hours. In contrast, in the daytime, many users use shared vehicles Vn while taking a detour for the purposes of sightseeing, etc. In the daytime, therefore, the threshold for detecting the return start occasion is set at a high value, as described above, to display the guidance route so as to match the timing when the user is actually willing to return the shared vehicle Vn.

In one or more embodiments of the present invention, the return start occasion for the user can be detected as the above. In addition or alternatively, the return start occasion may be detected in a scene in which the departure station and the arrival station are set at different locations in a similar manner to that in the above-described scene (scene of a round trip) in which the departure station and the arrival station are set at the same location. In general, however, the possibility that the user takes a detour is higher in a round trip and the return start occasion may therefore be detected only in a scene of a round trip.

In one or more embodiments of the present invention, the return start occasion may not be detected until the shared vehicle Vn travels a predetermined distance or a predetermined time passes after the user starts to use the shared vehicle Vn. This allows the guidance to be performed at appropriate timing to the user who does not intend to immediately return the shared vehicle Vn. The above predetermined distance may be, for example, but is not limited to, a short distance of about one meter or a long distance of about several kilometers or longer. The above predetermined time may be, for example, but is not limited to, a short time of about one second or a long time of about several tens of minutes or longer.

In one or more embodiments of the present invention, when the use form of the shared vehicle Vn by the user is the above-described round trip, the above predetermined distance and the above predetermined time are set at high values. This allows the guidance to be performed at appropriate timing to the user who does not intend to immediately return the shared vehicle Vn.

Figure 6C:
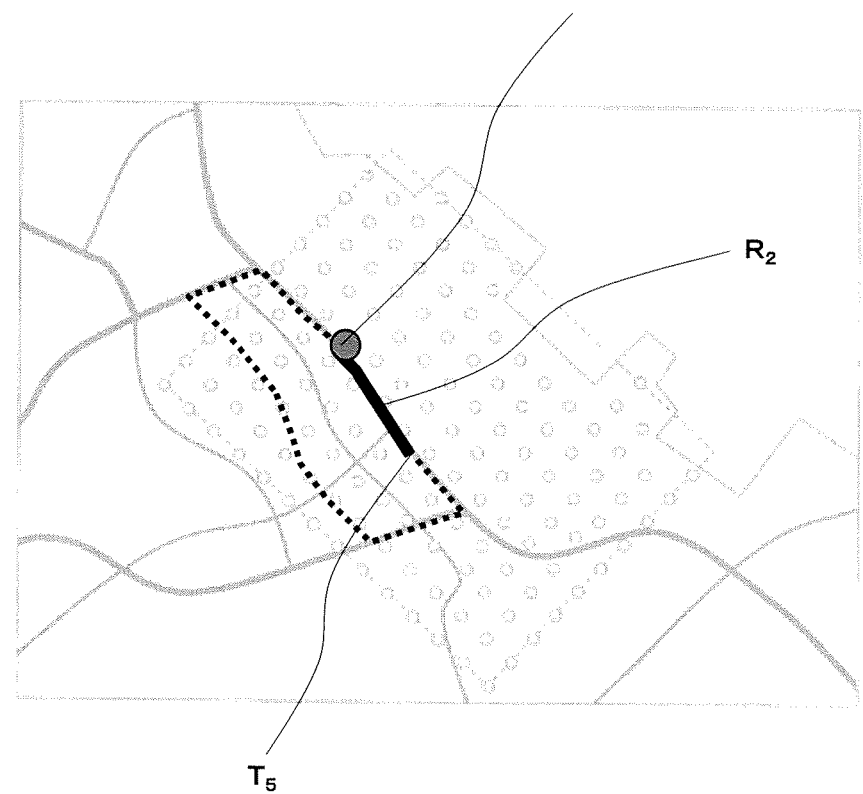
FIG. 6C is a diagram illustrating another example of a section in which the route is guided to the user.

In the method of the above-described example, when the reduction rate of the remaining distance for return is the predetermined threshold $VD_1$, $VD_2$ or more, this event is detected as the return start occasion. In one or more embodiments of the present invention, when a state in which the remaining distance for return decreases continues and its duration time becomes a predetermined threshold VT or more, this event may be detected as the return start occasion. For example, in the scene illustrated in FIG. 6B, when the remaining distance for return starts to decrease from time $T_4$, the time $T_4$ may be used as a start point to detect the time point (time $T_5$ illustrated in FIG. 6C), at which the duration time of decrease of the remaining distance for return becomes the predetermined threshold VT or more, as the return start occasion. This operation can prevent erroneous detection of the return start occasion due to the shared vehicle Vn temporarily heading to the arrival station because of inconvenience caused by the shape of the road, etc., and can therefore display the guidance route at timing that more matches the feeling of the user.

In addition or alternatively, in one or more embodiments of the present invention, when a remaining amount of driving energy for the shared vehicle Vn (which means a remaining amount of gasoline in a gasoline car driven by an internal-combustion engine or an amount of charge of a battery in an electric car, here and hereinafter) is a predetermined threshold VE or less, this event may be deemed as the return start occasion. This allows the guidance route to be displayed at timing when the remaining amount of driving energy decreases and the user starts thinking about return of the shared vehicle Vn. The guidance which matches the feeling of the user can thus be performed.

Also when the return start occasion is detected using the threshold VT on the basis of the duration time of decrease of the remaining distance for return and when the return start occasion is detected using the threshold VE on the basis of the remaining amount of driving energy for the shared vehicle Vn, as described above, values of the threshold VT and threshold VE may be changed, as described above, in accordance with the use history of the user, the date and time when the user uses the shared vehicle Vn, the regional attribute of the arrival station, etc.

In one or more embodiments of the present invention, the method of detecting the return start occasion may be any of the above-described method based on the reduction rate of the remaining distance for return, method based on the duration time of decrease of the remaining distance for return, and method based on the remaining amount of driving energy for the shared vehicle Vn, which may be solely used or may also be used in combination.

The database 30 of the shared vehicle management apparatus 100 according to one or more embodiments of the present invention will then be described. The database 30 stores shared vehicle information 31, station information 32, a use reservation 33 that is accepted from each user, a past record of use 34 that represents the use history of shared vehicles Vn by each user, and map information 35. In the example illustrated in FIG. 1B, only one database 30 is provided, but the shared vehicle management apparatus 100 according to one or more embodiments of the present invention may be provided with a plurality of databases 30, and the shared vehicle information 31, station information 32, use reservation 33, past record of use 34 and map information 35 may be stored in respective databases 30.

The shared vehicle information 31 is information that includes the ID, vehicle type/model, output, etc. of each shared vehicle Vn. The station information 32 is information that includes the positional information of each station, the maximum number of available parking spaces of each station, the number of parking vehicles and the number of empty spaces of each station, a geographical name that can be a landmark, the distance and road gradient between stations, and other necessary information. The station information 32 further includes information on the above-described regional attribute of each station.

The use reservation 33 represents input information which each user inputs to request the use of a shared vehicle Vn, such as using the user terminal device 400X and the onboard device 200Vn. The past record of use 34 represents information that is stored to record information on past records or the like that each user used shared vehicles Vn in past times. Examples of this information include information on the use time of a shared vehicle Vn when each user used shared vehicles Vn in past times and information on the departure station and arrival station which were used by the user.

The map information 35 is map information that encompasses at least all the stations illustrated in FIG. 2. From another aspect, the map information 35 is information that includes the distance between nodes or roads, gradient of nodes or roads, road width and road type, the name of buildings, and other necessary items.

The control device 10 of the shared vehicle management apparatus 100 according to one or more embodiments of the present invention includes, as illustrated in FIG. 1B, a read only memory (ROM) 12 that stores programs for executing processes to manage and operate the car sharing system, a central processing unit (CPU) 11 as an operation circuit that executes the programs stored in the ROM 12 to function as the shared vehicle management apparatus 100, and a random access memory (RAM) that functions as an accessible storage device.

The control device 10 of the shared vehicle management apparatus 100 achieves a use reservation acceptance function, a management function for past record of use, a return start occasion detection function, a route guidance function, a notification function, and a return acceptance function. The control device 10 of the shared vehicle management apparatus 100 according to one or more embodiments of the present invention is a computer that realizes each function by cooperation of software for achieving the above functions and the above-described hardware.

The above functions achieved by the control device 10 of the shared vehicle management apparatus 100 will be described below.

First, the use reservation acceptance function executed by the control device 10 according to one or more embodiments of the present invention will be described. The control device 10 uses the use reservation acceptance function to acquire from the user terminal device 400X a use reservation that requests the use of a shared vehicle Vn, and stores the acquired information on the use reservation as the use reservation 33 in the database 30. As described above, the use reservation includes ID information of the user, information on the current position of the user, information on the departure station which is set by the user, ID information of the shared vehicle Vn which the user expects to use, information on the arrival station which is set by the user, and other necessary information.

The management function for past record of use, which is executed by the control device 10 according to one or more embodiments of the present invention, will then be described. In one or more embodiments of the present invention, the control device 10 uses the management function for past record of use to store the past record of use 34 in the database 30. Again, the past record of use 34 represents information on the use time of a shared vehicle Vn when each user used shared vehicles Vn in past times, information on the departure station and arrival station which were used by the user, and other necessary information.

The return start occasion detection function executed by the control device 10 according to one or more embodiments of the present invention will then be described. In one or more embodiments of the present invention, the return start occasion detection function is used to detect the return start occasion for the user. This detection is performed, as described above, using information on the current position of the shared vehicle Vn used by the user, information on the remaining amount of driving energy for the shared vehicle Vn, and other necessary information. Then, the control device 10 uses the route guidance function to guide the route from the current position of the shared vehicle Vn to the arrival station, as illustrated in FIG. 3B, to the user.

The notification function executed by the control device 10 according to one or more embodiments of the present invention will then be described. The control device 10 uses the notification function to communicate with each onboard device 200Vn and each user terminal device 400X and notify the user of information that the use reservation of a shared vehicle Vn is accepted, etc.

The return acceptance function executed by the control device 10 according to one or more embodiments of the present invention will then be described. The return acceptance function executed by the control device 10 is a function to accept return of the shared vehicle Vn in response to a return acceptance request for the shared vehicle Vn (an offer of return the shared vehicle Vn) which is transmitted by the user via the onboard device 200Vn or the user terminal device 400X.

For example, when the arrival station for the shared vehicle V2 is set as the station ST2 as illustrated in FIG. 1A, the user U1 parks the shared vehicle V2 at the station ST2 and then operates the onboard device 200Vn to transmit a return acceptance request (an offer of return the shared vehicle) to the shared vehicle management apparatus 100, and the control device 10 can thereby accept the return of the shared vehicle V2.

The return acceptance request transmitted from the user includes the ID information and current position information of the shared vehicle Vn used by the user. On the basis of the ID information of the shared vehicle Vn included in the received return acceptance request (the offer of return the shared vehicle), the control device 10 reads out information corresponding to the ID information of the shared vehicle Vn from the use reservation 33 stored in the database 30 and determines whether or not the shared vehicle Vn is located at the preliminarily set arrival station. When a determination is made that the shared vehicle Vn is located at the arrival station, the control device 10 performs subsequent processes on the assumption that the shared vehicle Vn is appropriately returned.

In one or more embodiments of the present invention, the car sharing system is managed and operated as the above using the functions achieved by the control device 10 of the shared vehicle management apparatus 100.

According to one or more embodiments of the present invention, after the shared vehicle Vn travels a predetermined distance or a predetermined time passes from when the user starts to use the shared vehicle Vn, the control device 10 of the shared vehicle management apparatus 100 detects the return start occasion for the user on the basis of predetermined determination criteria and uses it as a trigger to start guidance of the travel route from the current position of the shared vehicle Vn to the arrival station. This can mitigate the uncomfortable feeling given to the user because the guidance route is displayed to the user at appropriate timing when the user does not go straight (head directly) to the destination after the user starts to use the shared vehicle Vn.

Figure 8:
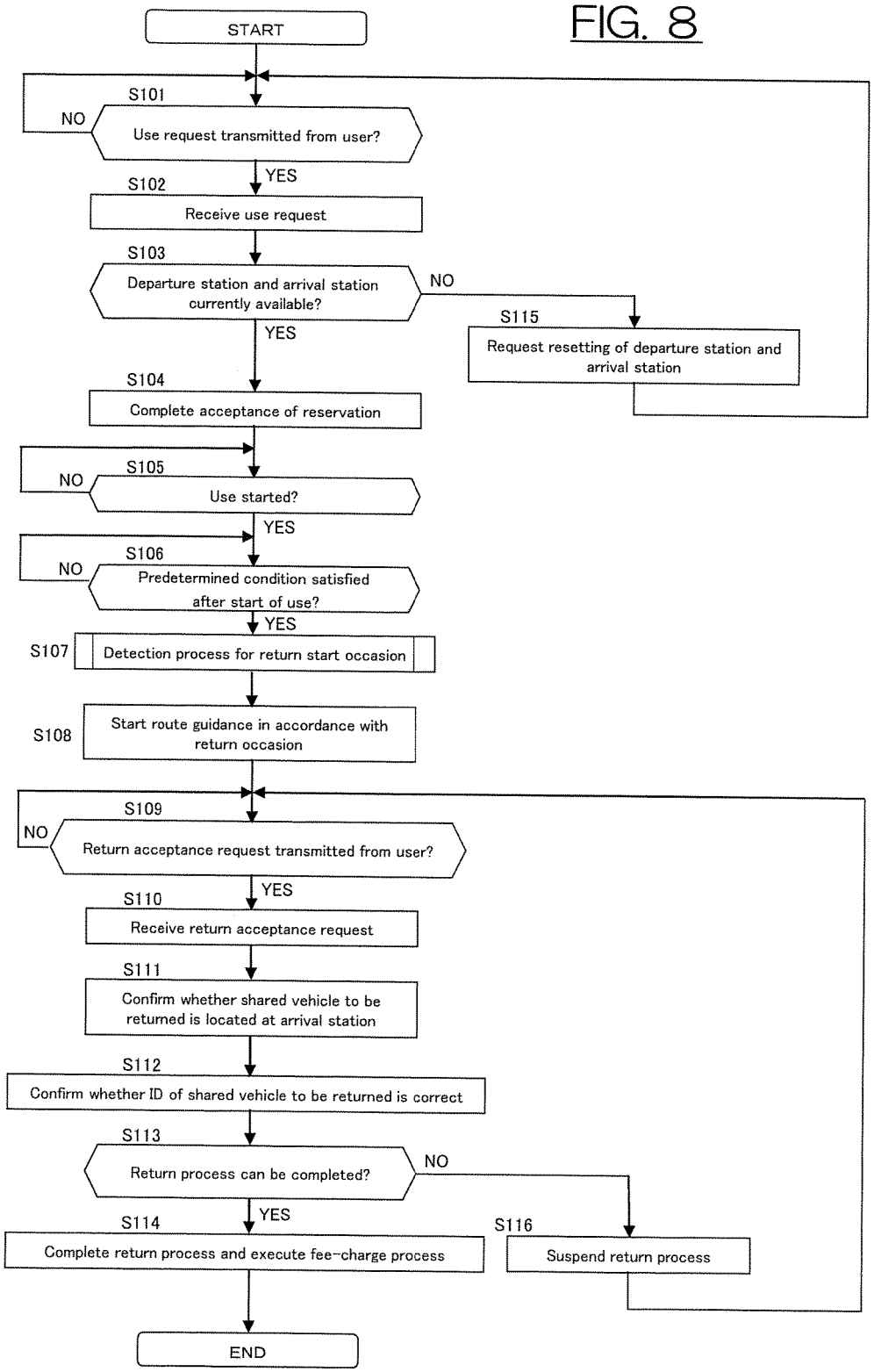
FIG. 8 is a flowchart illustrating an example of a control procedure in which the shared vehicle management apparatus according to one or more embodiments of the present invention guides a route to the arrival station to the user who is using the shared vehicle.

An example of the operation according to one or more embodiments of the present invention will then be described. FIG. 8 is a flowchart illustrating a control procedure of the car sharing system using the shared vehicle management apparatus 100 according to one or more embodiments of the present invention. The flowchart illustrated in FIG. 8 is for describing a control procedure in which a user transmits a use request to reserve the use of a shared vehicle Vn, uses the shared vehicle Vn, and then returns the shared vehicle Vn to the arrival station.

First, in step S101, the control device 10 of the shared vehicle management apparatus 100 determines whether or not a use request is transmitted from a user via the user terminal device 400X. The use request includes ID information of the user, information on the current position of the user, information on the departure station which is set by the user, ID information of the shared vehicle Vn which the user expects to use, and information on the arrival station which is set by the user. When, in step S101, a determination is made that a use request is transmitted, the routine proceeds to step S102. When, in step S101, a determination is made that a use request is not transmitted, the routine waits in step S101.

In step S102, the control device 10 receives the use request transmitted from the user in step S101 and stores it as the use reservation 33 in the database 30.

In step S103, the control device 10 refers to the use request, which is received in step S102, to determine whether or not the departure station and arrival station set by the user are currently available. For example, when a shared vehicle Vn is on standby at the station set as the departure station and the shared vehicle Vn is in a state in which the rental of the shared vehicle Vn can be accepted, the control device 10 determines that the departure station can be currently available. When the station set as the arrival station has a space in which the shared vehicle Vn can be newly parked, the control device 10 determines that the arrival station is currently available. When, in step S103, a determination is made that the departure station and the arrival station are currently available, the routine proceeds to step S104. When, in step S103, a determination is made that at least one of the departure station and the arrival station is not currently available, the routine proceeds to step S115, in which the control device 10 notifies the user of resetting of the departure station and the arrival station via the user terminal device 400X, and the routine returns to the above-described step S101.

In step S104, the control device 10 completes accepting the use reservation based on the use request transmitted from the user in step S101.

In step S105, the control device 10 determines whether or not the user starts to use the reserved, shared vehicle Vn. In step S105, the control device 10 waits until a determination is made that the user starts to use the shared vehicle Vn.

In step S106, the control device 10 determines whether or not any of two conditions is satisfied: a condition that the shared vehicle Vn travels a predetermined distance after the user starts to use the shared vehicle Vn; and a condition that a predetermined time passes after the user starts to use the shared vehicle Vn. In step S106, the control device 10 waits until at least one of the above conditions is satisfied.

Figure 9:
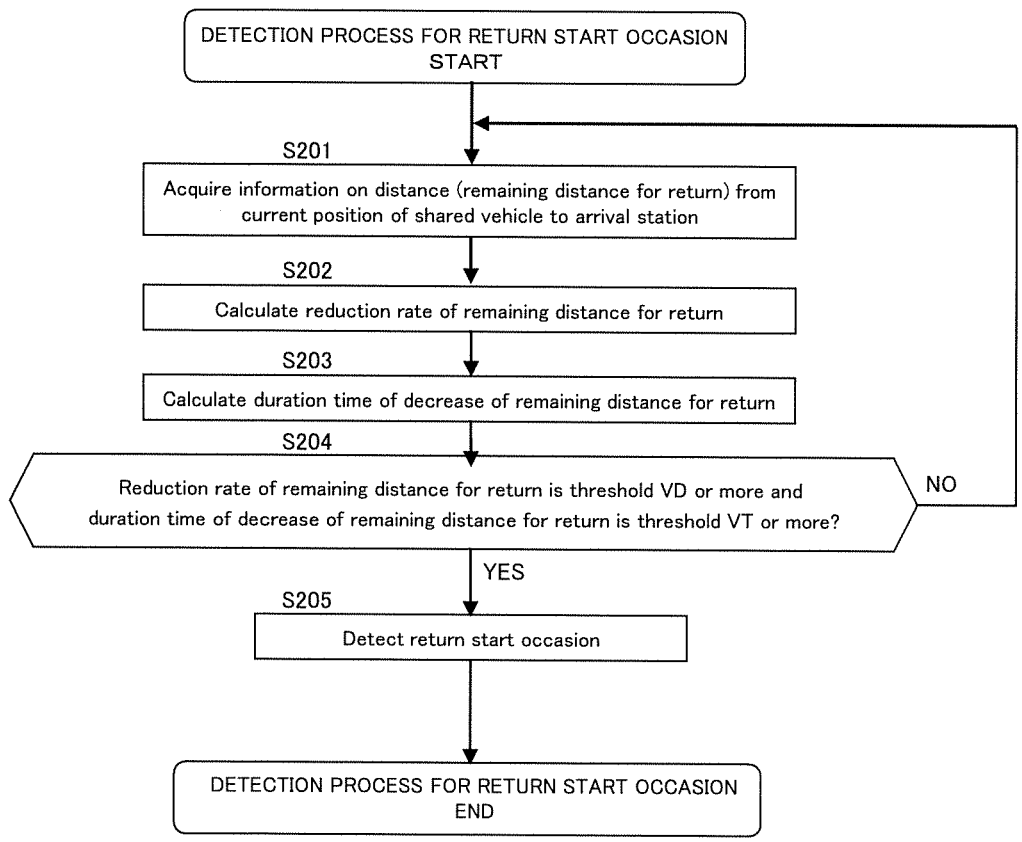
FIG. 9 is a flowchart illustrating an example of a control procedure in which the shared vehicle management apparatus according to one or more embodiments of the present invention detects the return start occasion for the user.

In step S107, the control device 10 performs a detection process for the return start occasion to detect the return start occasion for the user. FIG. 9 is a flowchart illustrating an example of the detection process for the return start occasion. In the detection process for the return start occasion illustrated in FIG. 9, the control device 10 combines the method based on the reduction rate of the remaining distance for return and the method based on the duration time of decrease of the remaining distance for return to perform detection of the return start occasion. The detection process for the return start occasion will be described below with reference to FIG. 9.

First, in step S201 illustrated in FIG. 9, the control device 10 acquires information on the distance (remaining distance for return) from the current position of the shared vehicle Vn used by the user to the arrival station.

In step S202, the control device 10 calculates the reduction rate of the remaining distance for return per unit time. The reduction rate of the remaining distance may be represented, for example, by the value of a reduction amount of the remaining distance for return per minute.

In step S203, the control device 10 calculates the duration time of decrease of the remaining distance for return when the remaining distance for return decreases.

In step S204, a determination is made whether or not the reduction rate of the remaining distance for return calculated in step S202 is a predetermined threshold VD or more and the duration time of decrease of the remaining distance for return calculated in step S203 is a predetermined threshold VT or more. When, in step S204, a determination is made that the above reduction rate is the threshold VD or more and the above duration time is the threshold VT or more, the routine proceeds to step S205. In step S205, the time point when the determination is made is detected as the return start occasion and the detection process for the return start occasion is completed. When, in step S204, a determination is made that a condition is not satisfied that the above reduction rate is the threshold VD or more and the above duration time is the threshold VT or more, the routine returns to step S201 to repeat the above-described process from step S201 to S204 until the return start occasion is detected.

Figure 10:
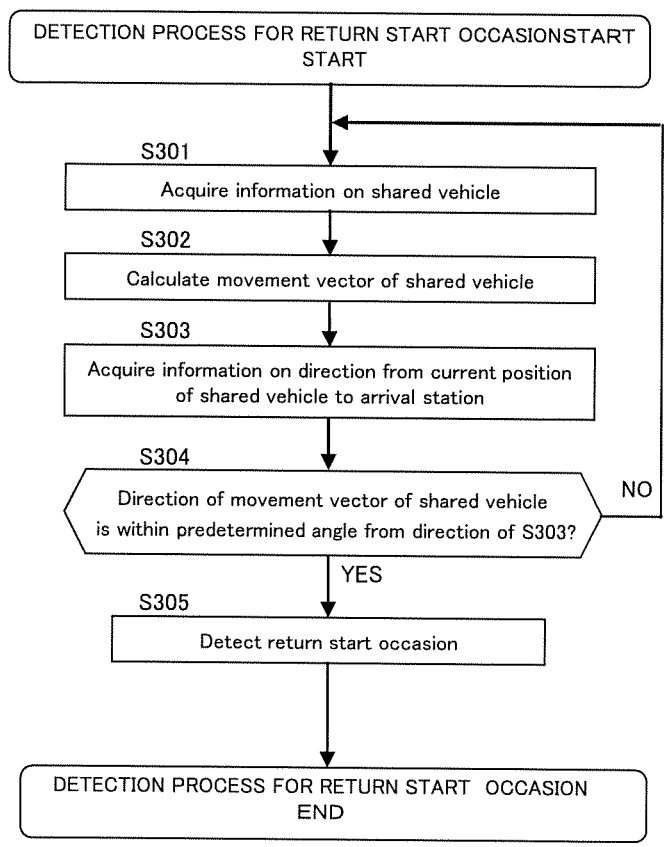
FIG. 10 is a flowchart illustrating another example of a control procedure in which the shared vehicle management apparatus according to one or more embodiments of the present invention detects the return start occasion for the user.

In addition or alternatively, in step S107, another detection process for the return start occasion may be performed as illustrated in the flowchart of FIG. 10. In the detection process for the return start occasion illustrated in FIG. 10, the control device 10 obtains the travel direction (movement vector) of the shared vehicle Vn and detects the return start occasion on the basis of the movement vector. The detection process for the return start occasion will be described below with reference to FIG. 10.

First, in step S301 illustrated in FIG. 10, the control device 10 acquires information on parameters, such as a speed, travel direction and movement trajectory of the shared vehicle Vn, using various sensors and the like equipped in the shared vehicle Vn.

In step S302, the control device 10 calculates the movement vector of the shared vehicle Vn on the basis of the information acquired in step S301. The movement vector can be obtained, for example, by calculating an average movement vector within a predetermined time period on the basis of the parameters, such as a speed, travel direction and movement trajectory of the shared vehicle Vn, within the predetermined time period.

In step S303, the control device 10 obtains a straight line directing from the current position of the shared vehicle Vn toward the arrival station set by the user and acquires information on the direction of the straight line.

In step S304, a determination is made whether or not the direction of the movement vector of the shared vehicle Vn calculated in step S302 is within a predetermined angle from the direction of the straight line acquired in step S303. When, in step S304, a determination is made that the direction of the movement vector of the shared vehicle Vn is within the above predetermined angle, the routine proceeds to step S305. In step S305, the time point when the determination is made is detected as the return start occasion and the detection process for the return start occasion is completed. When, in step S304, a determination is made that the direction of the movement vector of the shared vehicle Vn is not within the above predetermined angle, the routine returns to step S301 to repeat the above-described process from step S301 to S304 until the return start occasion is detected.

In the above-described examples, the method illustrated in FIG. 9 and the method illustrated in FIG. 10 are described for the detection process for the return start occasion, but these methods may be solely used or may also be used in combination.

Referring again to FIG. 8, in step S108 of FIG. 8, the above-described return start occasion detected in step S107 is used as a trigger to display the route (guidance route) from the current position of the shared vehicle Vn to the arrival station to the user via the onboard device 200Vn or the user terminal device 400X.

In step S109, the control device 10 determines whether or not a return acceptance request is transmitted from the user willing to return the shared vehicle Vn. The return acceptance request transmitted from the user includes ID information of the user and ID information and positional information of the shared vehicle Vn used by the user. When, in step S109, a determination is made that the return acceptance request is transmitted, the routine proceeds to step S110. When, in step S109, a determination is made that the return acceptance request is not transmitted, the routine waits in step S109.

In step S110, the control device 10 receives the return acceptance request transmitted from the user in step S109.

In step S111, the control device 10 confirms whether or not the shared vehicle Vn, which the user is willing to return, is located at the arrival station set for the shared vehicle Vn, on the basis of the return acceptance request received in step S110 and the information on the use reservation 33 stored in the database 30.

In step S112, the control device 10 confirms whether or not the ID information of the shared vehicle Vn, which the user is willing to return, matches the ID information of the shared vehicle Vn included in the use reservation 33, on the basis of the return acceptance request (an offer of the return) received in step S110 and the information on the use reservation 33 stored in the database 30.

In step S113, the control device 10 determines whether or not a return process can be completed for the shared vehicle Vn which the user is willing to return. Specifically, when determining, on the basis of the information confirmed in steps S111 and S112, that the current position of the shared vehicle Vn which the user is willing to return matches the position of the set arrival station and the ID information of the shared vehicle Vn to be returned matches the ID information of the shared vehicle Vn included in the use reservation 33, the control device 10 determines that the return process for the shared vehicle Vn can be completed. When, in step S113, a determination is made that the return process for the shared vehicle Vn can be completed, the routine proceeds to step S114. When, in step S113, a determination is made that the return process for the shared vehicle Vn cannot be completed, the routine proceeds to step S116, in which the control device 10 suspends the return process for the shared vehicle Vn, and the routine returns to the above-described step S109.

When, in step S113, a determination is made that the return process for the shared vehicle Vn can be completed, the routine proceeds to step S114, in which the control device 10 completes the return process for the shared vehicle Vn, calculates the use time of the shared vehicle Vn by the user, charges the use fee of the shared vehicle Vn to the user in accordance with the calculated use time, and exits the process.

In one or more embodiments of the present invention, the shared vehicle management apparatus 100 accepts the use request for reserving the use of the shared vehicle Vn from the user and uses the return start occasion for the user as a trigger to display the guidance route while managing the use and return of the shared vehicle Vn by the user, as described above. The process illustrated in FIG. 8 is executed repeatedly at a relatively short period (e.g., at a short period of several milliseconds).

The shared vehicle management system according to one or more embodiments of the present invention is configured and operated as the above and the following effects can therefore be obtained.

(1) According to one or more embodiments of the present invention, the return start occasion for the user is detected and used as a trigger to start guidance of the travel route from the current position of the shared vehicle Vn to the arrival station. This can mitigate the uncomfortable feeling given to the user because the guidance route is displayed to the user at appropriate timing even when the user does not head directly (go straight) to the destination after the user starts to use the shared vehicle Vn.

(2) According to one or more embodiments of the present invention, when the use reservation by the user is a round trip in which the departure station and the arrival station are the same, the return start occasion is detected and the guidance route can thereby be displayed to the user at appropriate timing in a scene of the round trip in which the possibility that the user takes a detour is particularly high. The uncomfortable feeling given to the user can thus be mitigated.

(3) According to one or more embodiments of the present invention, when a state is detected in which the reduction rate of the distance from the current position of the shared vehicle Vn to the arrival station (remaining distance for return) per unit time is a predetermined threshold VD or more or when the duration time of a state in which the remaining distance for return decreases is a predetermined threshold VT or more, this event is detected as the return start occasion. The guidance route is therefore displayed in a scene in which the user actually starts to return the shared vehicle Vn, and the uncomfortable feeling given to the user can be mitigated.

(4) According to one or more embodiments of the present invention, when it is detected that the shared vehicle Vn travels toward the arrival station set for the shared vehicle Vn, this event is detected as the return start occasion. The guidance route is therefore displayed in a scene in which the user actually starts to return the shared vehicle Vn, and the uncomfortable feeling given to the user can be mitigated.

(5) According to one or more embodiments of the present invention, when a remaining amount of driving energy for the shared vehicle Vn is a predetermined threshold VE or less, this event is deemed as the return start occasion. This allows the guidance route to be displayed at timing when the remaining amount of driving energy decreases and the user starts thinking about return of the shared vehicle Vn. The guidance which matches the feeling of the user can thus be performed. Moreover, such display of the guidance route can encourage the user to return the shared vehicle Vn when the remaining amount of driving energy decreases.

(6) According to one or more embodiments of the present invention, in the event of detecting the return start occasion in a day and/or at a time when the use time of the shared vehicle Vn by one user is long, the threshold for detecting the return start occasion is set at a higher value than that in the event of detecting the return start occasion in a day and/or at a time when the use time is short. The guidance route is therefore displayed at timing that more matches the feeling of the user and the uncomfortable feeling given to the user can be mitigated.

(7) According to one or more embodiments of the present invention, as the time when the user is using the shared vehicle Vn comes close to the end of business hours in which the shared vehicle Vn is available, the threshold for detecting the return start occasion is set at a lower value and the guidance route can thereby be displayed at timing that matches the feeling of the user who starts to return the shared vehicle Vn by the end of business hours. The uncomfortable feeling given to the user can thus be mitigated.

(8) According to one or more embodiments of the present invention, on the basis of the use history of shared vehicles Vn by the user, the threshold for detecting the return start occasion is set at a higher value as the use time for the user to use the shared vehicle Vn is longer in each use. The guidance route is therefore displayed in accordance with the use form of the user at timing that more matches the feeling of the user and the uncomfortable feeling given to the user can be mitigated.

(9) According to one or more embodiments of the present invention, the return start occasion is detected in accordance with the regional attribute of the arrival station set for the shared vehicle Vn. When, for example, the arrival station having a regional attribute of a high possibility of detour is set, the threshold for detecting the return start occasion is set at a low value. The guidance route is therefore displayed in accordance with the use form of the user at timing that more matches the feeling of the user and the uncomfortable feeling given to the user can be mitigated.

(10) When the shared vehicle management method according to one or more embodiments of the present invention is executed, the above-described actions and effects can be obtained.

Embodiments of the present invention have been heretofore described, but these embodiments are described to facilitate understanding of the present invention and are not described to limit the present invention. It is therefore intended that the elements disclosed in the above embodiments include all design changes and equivalents to fall within the technical scope of the present invention.

In the above-described embodiments, the control device 10 of the shared vehicle management apparatus 100 represents each of the reservation acceptance device, return occasion detector, route guidance device, round trip determination device, and remaining distance detector according to one or more embodiments of the present invention, and the database 30 of the shared vehicle management apparatus 100 represents the first storage and second storage according to one or more embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

1000 Shared vehicle management system
100 Shared vehicle management apparatus
10 Control device
20 Communication device
30 Database
V1 to Vn Shared vehicle
200V1 to 200Vn Onboard device
300 Internet
400X to 400Z User terminal device

The invention claimed is:

1. A navigation system for managing shared vehicles shared by users, comprising:
a first storage configured to store information on a plurality of stations at which the shared vehicles can be used and returned;
a reservation acceptance device configured to accept a use reservation of a shared vehicle from a user,
the use reservation including information on a departure station and an arrival station,
the departure station being set by the user as a station from which the user expects to use the shared vehicle, and
the arrival station being set by the user as a station to which the user returns the shared vehicle after use;
a return occasion detector configured to detect a return start occasion on which the user using the shared vehicle returns the shared vehicle based on a remaining distance for return from the current position of the shared vehicle to the arrival station;
a route guidance device configured to execute guidance of a travel route including a route from a current position of the shared vehicle used by the user to the arrival station set for the shared vehicle; and
a remaining distance detector configured to:
 detect a remaining distance for return that is a distance from the current position of the shared vehicle to the arrival station set for the shared vehicle and
 calculate a reduction rate of the remaining distance for return per unit time as a positive value when the shared vehicle is traveling toward the arrival station and a negative value when the shared vehicle is traveling away from the arrival station,
wherein, the route guidance device does not start the guidance of the travel route until the return occasion detector detects the return start occasion for the user after the user starts to use the shared vehicle, and the route guidance device uses detection of the return start occasion by the return occasion detector as a trigger to start the guidance of the travel route,
wherein the return occasion detector is configured to detect the return start occasion based on the comparison result between data obtained by using the remaining distance for return that is a distance from the current position of the shared vehicle to the arrival station and a predetermined threshold value, wherein, when the reduction rate is a reduction rate threshold or more, the return occasion detector detects the return start occasion, and wherein the reduction rate threshold is corrected from a first value to a second value based on a detected situation.

2. The navigation system according to claim 1, wherein the return occasion detector changes the threshold for detecting the return start occasion based on a regional attribute of the arrival station.

3. The navigation system according to claim 2, wherein the regional attribute includes an attribute related to the areas that are within a predetermined distance of a sightseeing spot.

4. The navigation system according to claim 1, further comprising:
a round trip determination device configured to determine whether or not the use reservation by the user is a round trip that is in a use form in which the departure station and the arrival station is the same station,
wherein the return occasion detector performs a detection process for the return start occasion when the use reservation by the user is a round trip.

5. The navigation system according to claim 1,
wherein, when a duration time of a state in which the remaining distance for return decreases is a duration time threshold or more, the return occasion detector detects this event as the return start occasion.

6. The navigation system according to claim 1, wherein, when the shared vehicle travels toward the arrival station set for the shared vehicle, the return occasion detector detects this event as the return start occasion.

7. The navigation system according to claim 1, wherein, when a remaining amount of driving energy for the shared vehicle is a remaining amount threshold or less, the return occasion detector deems this event as the return start occasion.

8. The navigation system according to claim 1, wherein, in an event of detecting the return start occasion in a day or at a time when a use time of the shared vehicle by one user is longer than a first predetermined period, the return occasion detector sets a threshold for detecting the return start occasion at a higher value than that in an event of detecting the return start occasion in a day or at a time when the use time is shorter than a second predetermined period, which is less than the first predetermined period.

9. The navigation system according to claim 1, wherein, when the user is using the shared vehicle within a predefined period before a close of business hours in a time zone in which the user can use the shared vehicle, the return occasion detector sets a threshold for detecting the return start occasion at a lower value than if the user is using the shared vehicle outside the predetermined period.

10. The navigation system according to claim 1, further comprising
a second storage configured to store history information of a use time for the user to use the shared vehicle in each use,
wherein the return occasion detector sets, on a basis of the history information, a threshold for detecting the return start occasion at a higher value as the use time for the user is longer.

11. The navigation system according to claim 1, wherein the return occasion detector detects the return start occasion on a basis of a regional attribute of the arrival station set for the shared vehicle.

12. The navigation system according to claim 1, wherein the return occasion detector changes the threshold for detecting the return start occasion when the arrival station that is set has a regional attribute in which a possibility of detour is higher than a predetermined possibility threshold.

13. The navigation system according to claim 1, wherein the return occasion detector is configured to:
calculate a remaining distance for return from the current position of the shared vehicle to the arrival station, and an arriving time when the shared vehicle arrives at the arrival station based on the remaining distance, and
detect the return start occasion based on the arriving time.

14. The navigation system according to claim 1, wherein the route guidance device is configured to suspend the display of the guidance route being displayed when the user starts a detour or round trip.

15. A navigation method executed by a computer for managing shared vehicles shared by users, comprising:
storing information on a plurality of stations at which the shared vehicles can be used and returned;
accepting a use reservation of a shared vehicle from a user,
the reservation including information on a departure station and an arrival station,
the departure station being set by the user as a station from which the user expects to use the shared vehicle, and
the arrival station being set by the user as a station to which the user returns the shared vehicle after use;
detecting a return start occasion on which the user using the shared vehicle returns the shared vehicle based on a remaining distance for return from the current position of the shared vehicle to the arrival station;
waiting to start guidance of a travel route to the user until the return start occasion for the user is detected after the user starts to use the shared vehicle, and using detection of the return start occasion for the user as a trigger to start the guidance of the travel route;
detecting a remaining distance for return that is a distance from the current position of the shared vehicle to the arrival station set for the shared vehicle; and
calculating a reduction rate of the remaining distance for return per unit time as a positive value when the shared vehicle is traveling toward the arrival station and a negative value when the shared vehicle is traveling away from the arrival station,
wherein the travel route includes a route from a current position of the shared vehicle used by the user to the arrival station set for the shared vehicle,
wherein the detecting the return start occasion is performed based on the comparison result between data obtained by using a remaining distance for return that is a distance from the current position of the shared vehicle to the arrival station and a predetermined threshold value,
wherein when the reduction rate is a reduction rate threshold or more, the return start occasion is detected, and
wherein the reduction rate threshold is corrected from a first value to a second value based on a detected situation.

* * * * *